April 1, 1958   S. S. CHARSCHAN   2,828,530
FLASH REMOVING TOOL
Filed Sept. 27, 1955
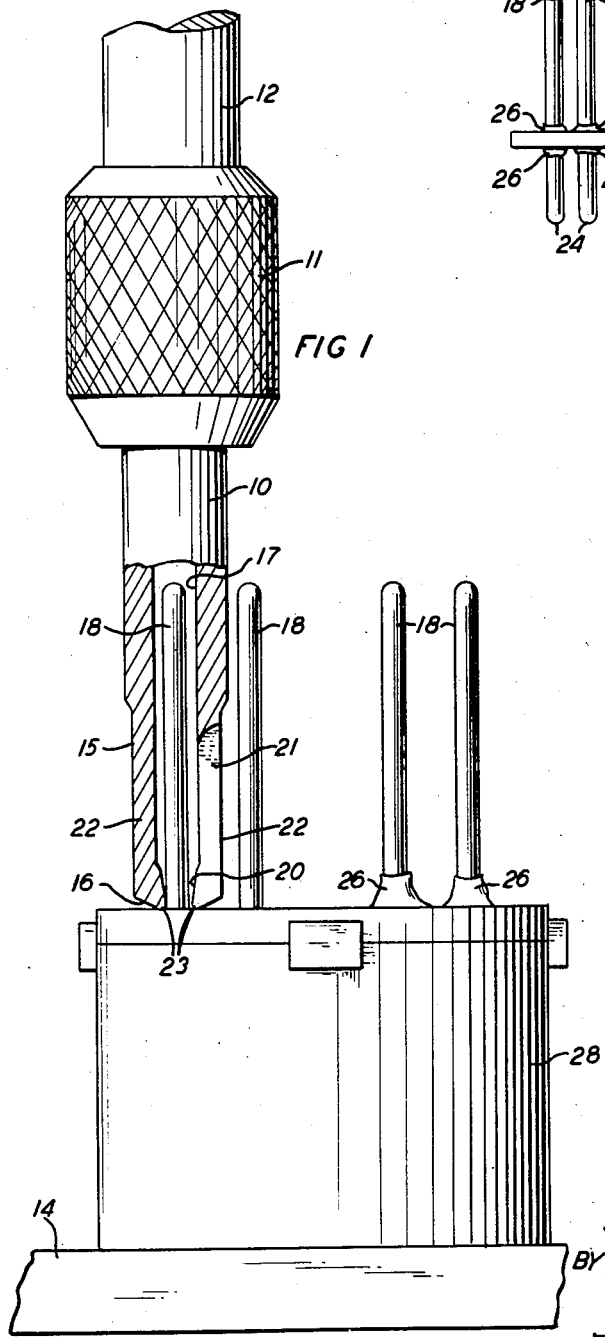
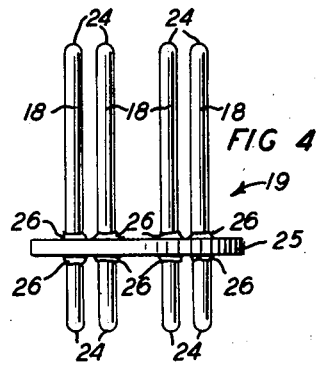
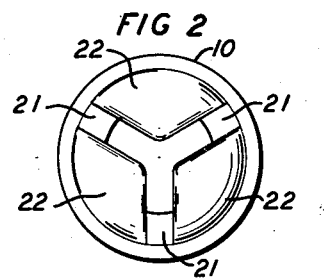
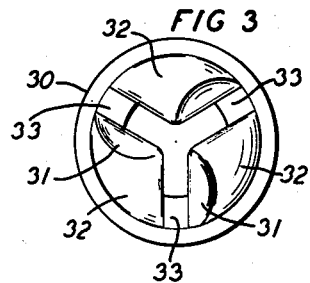
INVENTOR
S. S. CHARSCHAN
BY
ATTORNEY ём
United States Patent Office

2,828,530
Patented Apr. 1, 1958

2,828,530

FLASH REMOVING TOOL

Sidney S. Charschan, Brooklyn, N. Y., assignor to Western Electric Company, Incorporated, New York, N. Y., a corporation of New York Application September 27, 1955, Serial No. 536,962

1 Claim. (Cl. 29—103)

This invention relates to tools for removing flash from molded articles particularly terminals molded in plastic bases.

In the manufacture of certain electrical units, conventional hollow or tube-like terminals with rounded ends are molded in various types of plastic bases. The molding operations produce flash around the terminals which must be removed before continuing with the processing of the various electrical units of which these structures are to be parts.

The object of the present invention is a tool which, although simple in structure, is highly efficient in removing flash from terminals without marring or damaging the terminals.

In one embodiment of the invention the tool comprises a rotatable body axially apertured through an entrance end thereof to receive the terminal during relative aligned movement of the body and terminal and during rotation of the body to cause the body to remove flash from the terminal.

More specifically, this embodiment of the invention includes a tool which may be mounted in the chuck of a drill press from which it may receive its rotary and axial movements. The aperture in the body of the tool is for the most part larger than the cross-sectional contour of the terminal while the entrance end of the aperture is smaller than the terminal. The body has slots cut therein for a given distance through and away from the entrance end to produce resilient jaw-like members adapted to be flexed outwardly to receive the terminal and to closely engage the terminal to remove any flash therefrom free of damage to the terminal. To assure against any damage to the terminal, the edges adjacent the entrance end of the aperture are rounded.

Other objects and advantages will be apparent from the following detailed description when considered in conjunction with the accompanying drawing, wherein:

Fig. 1 is a front elevational view of the tool mounted in a chuck of a drill press, a portion of the tool being shown in section;

Fig. 2 is an end elevational view of the tool shown in Fig. 1;

Fig. 3 is an end elevational view of another species of tool, and

Fig. 4 is a side elevational view of an article formed of terminal molded in a plastic base.

The tool shown in Figs. 1 and 2 includes a body 10 receivable in a chuck 11 on a spindle 12 of a drill press having a work support 14. The body 10 has a reduced portion 15 and a tapered end 16 which may be identified as the leading end of the tool. The body 10 is centrally apertured at 17, the major portion of the aperture being larger than terminals 18 of articles such as that shown at 19 in Fig. 4. The lower end of the aperture 17 narrows gradually in a conical fashion as indicated at 20 so that the outermost or entrance end of the aperture will be smaller than the terminals 18. The reduced portion 15 of the tool has radially extending slots 21 through the leading end of the body to produce resilient members 22 with rounded edges 23 surrounding the entrance end of the aperture. The rounded edges 23 are exaggerated in the drawing. It is important only that the initially sharp edges be removed to avoid damage to the terminals.

The terminals 18 of the article 19 are of the conventional tubular structures with rounded ends 24 and having outer diameters of .125 inch. Any desired number of the terminals are molded in bases 25 of varied contours, but, during the molding operations flashes 26 of the material of which the base is molded extends around the adjacent portions of the terminals.

Considering now the function of the tool, it will be apparent that with the aid of a suitable fixture 28 for positioning the article 19 on the work support 14 the terminals may be aligned singly with the tool 10 while it is rotated and moved axially over and longitudinally of each terminal. In the present embodiment of the invention, the inside diameter of the entrance end of the tool is .115 inch which is smaller than the outer diameter of the terminals making it necessary for the jaws or resilient members 22 of the tool to flex outwardly, applying suitable force of the members on the outer surface of the terminal to remove the flash. The edges 23 of the tool having been rounded there will be no cutting action but the tool will crush the material 26 allowing no flash to remain on the terminal. Furthermore, the rounded surfaces 23 will produce a burnishing or polishing action on each terminal but will not in any way damage the terminal or the metal finish thereon. It is apparent that this operation may be repeated rapidly, the rounded ends of the terminals assisting in opening the entrance end of the tool and, if desired, a suitable stop may be provided including, as an example, the conventional stop in the drill press. The major portion of the travel of the tool on each terminal is free of any action other than polishing the terminal but as soon as the tool reaches the flash 26, the material thereof will be crushed and the revolving action of the tool causes the loosened flash to flake off and be removed from the terminal.

The species of the tool shown in Fig. 3 and identified by reference numeral 30 is identical in every detail with the species shown in Figs. 1 and 2, with the exception that cutaway portions 31 are formed in resilient jaws 32 thereof adjacent the leading edges of the adjacent slots 33. The function of these cutaway portions is to facilitate in the escapement of the particles of the flash from each terminal.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

A tool for removing flash from a terminal having a round cross-sectional contour of a given diameter, rounded ends and molded intermediate its ends in a plastic base, the tool comprising a body, having an axis, mounted for axial movement and for rotation about the axis, the body being axially apertured through an entrance end thereof, the aperture having a cross-sectional contour larger than the cross-sectional contour of the terminal except adjacent the entrance end where the aperture narrows gradually in a conical fashion to the entrance end where the aperture is smaller than the cross-sectional contour of the terminal, the body having slots, radially positioned from the axis and extending for a predetermined length of the body through the entrance end, the entrance end of the body being tapered away from the entrance end of the aperture, and resilient members of the body interposed between the slots and supplying radial compressive action of single point contacts of rounded points, at the junctures of the slots, the conical end of the aperture and the tapered entrance end of the body to crush the flash without marring the finish of the terminal.

References Cited in the file of this patent

UNITED STATES PATENTS

| | | |
|---|---|---|
| 658,337 | Brown | Sept. 25, 1900 |
| 834,457 | Culman | Oct. 30, 1906 |
| 935,247 | Crane | Sept. 28, 1909 |
| 983,018 | Bechberger | Jan. 31, 1911 |
| 2,301,655 | Axel | Nov. 10, 1942 |
| 2,357,515 | Jackman | Sept. 5, 1944 |
| 2,390,651 | Iseman | Dec. 11, 1945 |
| 2,431,654 | White | Nov. 25, 1947 |
| 2,473,654 | Loesen | June 21, 1949 |
| 2,493,039 | Scochia | Jan. 3, 1950 |
| 2,541,455 | Anderson | Feb. 13, 1951 |
| 2,704,011 | Fruenberger | Mar. 15, 1955 |